(12) United States Patent
Huang et al.

(10) Patent No.: US 8,045,434 B2
(45) Date of Patent: Oct. 25, 2011

(54) METHOD OF ACCESSING INFORMATION STORED IN PREDETERMINED DATA AREA ON OPTICAL DISC AND INFORMATION REPRODUCING APPARATUS THEREOF

(75) Inventors: Cheng-Chi Huang, Hsinchu County (TW); Chao-Ming Huang, Taipei Hsien (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 917 days.

(21) Appl. No.: 11/769,709

(22) Filed: Jun. 28, 2007

(65) Prior Publication Data

US 2008/0080339 A1    Apr. 3, 2008

Related U.S. Application Data

(60) Provisional application No. 60/827,216, filed on Sep. 28, 2006.

(51) Int. Cl.
*G11B 7/0045* (2006.01)
(52) U.S. Cl. .................................................. 369/53.24
(58) Field of Classification Search ............... 369/53.24
See application file for complete search history.

(56) References Cited

U.S. PATENT DOCUMENTS

| 2001/0017823 | A1* | 8/2001 | Ishihara ........................ 369/32 |
| 2002/0159343 | A1* | 10/2002 | Fujimoto .................... 369/44.28 |
| 2003/0095481 | A1* | 5/2003 | Williams et al. ........... 369/47.28 |
| 2003/0117913 | A1* | 6/2003 | Mano ......................... 369/44.29 |
| 2003/0223333 | A1* | 12/2003 | Park et al. ..................... 369/52.1 |
| 2004/0095859 | A1* | 5/2004 | Kobayashi et al. ......... 369/44.29 |
| 2004/0136302 | A1* | 7/2004 | Lee et al. .................... 369/53.35 |
| 2006/0114808 | A1 | 6/2006 | Sugaya et al. |
| 2006/0120258 | A1 | 6/2006 | Sugaya et al. |
| 2006/0126485 | A1 | 6/2006 | Sugaya et al. |
| 2007/0025219 | A1* | 2/2007 | Ashitani et al. ............ 369/53.39 |

OTHER PUBLICATIONS

Yu et al., Title of Invention: Methods Applied to Optical Storage Medium for Identifying Boundary Between Areas Storing Information With Different Characteristics, U.S. Appl. No. 12/037,092, filed Feb. 26, 2008.

* cited by examiner

*Primary Examiner* — Will J Klimowicz
*Assistant Examiner* — Emily Frank
(74) *Attorney, Agent, or Firm* — Winston Hsu; Scott Margo

(57) ABSTRACT

A method of accessing an optical disc is disclosed. The method includes: enabling a focus servo control without enabling a tracking servo control, and then moving an optical pick-up unit in a radial direction of the optical disc; obtaining at least a first reference signal and a second reference signal according to a laser beam reflected from the optical disc when the optical pick-up unit is moving in the radial direction; and monitoring at least the first reference signal and the second reference signal to identify a boundary of a predetermined data area on the optical disc.

30 Claims, 11 Drawing Sheets

METHOD OF ACCESSING INFORMATION STORED IN PREDETERMINED DATA AREA ON OPTICAL DISC AND INFORMATION REPRODUCING APPARATUS THEREOF

CROSS REFERENCE TO RELATED APPLICATIONS

This application claims the benefit of U.S. Provisional Application No. 60/827,216, which was filed on Sep. 28, 2006 and is included herein by reference.

BACKGROUND

The present invention relates to accessing information recorded on an optical disc, and more particularly, to a method of accessing system lead-in information on an optical disc by moving an optical pick-up unit to a system lead-in area before the tracking servo is enabled or the disc type is identified, and related information reproducing apparatus thereof.

Optical disc has become a popular storage medium today. An information reproducing apparatus therefore is designed to read data from or record data onto a loaded optical disc. In general, a servo system is implemented to control tracking and focusing of an optical pick-up unit when accessing the optical disc. Generally speaking, the parameters of the tracking servo control and the focusing servo control should be properly set to have optimum data accessing performance. However, if the parameters are not accurately initialized before enabling the tracking servo control and the focusing servo control, the servo system or the read channel might become unstable. Taking the HD-DVD disc for example, a lot of information is recorded in a system lead-in area, such as the book type (disc type), mark polarity (high-to-low disc or low-to-high disc), burst cutting area (BCA) flag, track shape, disc code (disc manufacturer ID), etc. In a case where the mark polarity is erroneously determined, the stability of the servo system and the read channel is not guaranteed. Therefore, a novel mechanism of reading the system lead-in information for adequately initializing servo parameters set to the tracking servo and/or the focusing servo is required to improve the data accessing performance.

SUMMARY

It is therefore one of the present invention to provide a method of accessing system lead-in information on an optical disc by moving an optical pick-up unit to a system lead-in area before the tracking servo is enabled or the disc type is identified and information reproducing apparatus thereof, to solve the above problems.

According to one aspect of the present invention, a method of accessing an optical disc is disclosed. The method includes enabling a focus servo control without enabling a tracking servo control, and then moving an optical pick-up unit in a radial direction of the optical disc; obtaining at least a first reference signal and a second reference signal according to a laser beam reflected from the optical disc when the optical pick-up unit is moving in the radial direction; and monitoring at least the first reference signal and the second reference signal to identify a boundary of a predetermined data area on the optical disc.

According to another aspect of the present invention, a method of accessing an optical disc is disclosed. The method includes: enabling a focus servo control without enabling a tracking servo control, and then moving an optical pick-up unit in a radial direction of the optical disc; obtaining a wobble signal according to a laser beam reflected from the optical disc when the optical pick-up unit is moving in the radial direction; and monitoring the wobble signal to identify a boundary of a predetermined data area on the optical disc.

According to another aspect of the present invention, a method of accessing an optical disc is disclosed. The method includes: providing a detector positioned at a predetermined position; moving an optical pick-up unit in a radial direction of the optical disc; utilizing the detector to detect if the optical pick-up unit reaches the predetermined position; and when the detector detects that the optical pick-up unit reaches the predetermined position, referring to the predetermined position for controlling the optical pick-up unit to access information stored in a predetermined data area on the optical disc.

According to yet another aspect of the present invention, a method of accessing an optical disc is disclosed. The method includes: rotating the optical disc; enabling a focus servo control and a tracking servo control; and before a disc type of the optical disc is identified, moving an optical pick-up unit into a predetermined lead-in area on the optical disc for accessing lead-in information stored therein.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
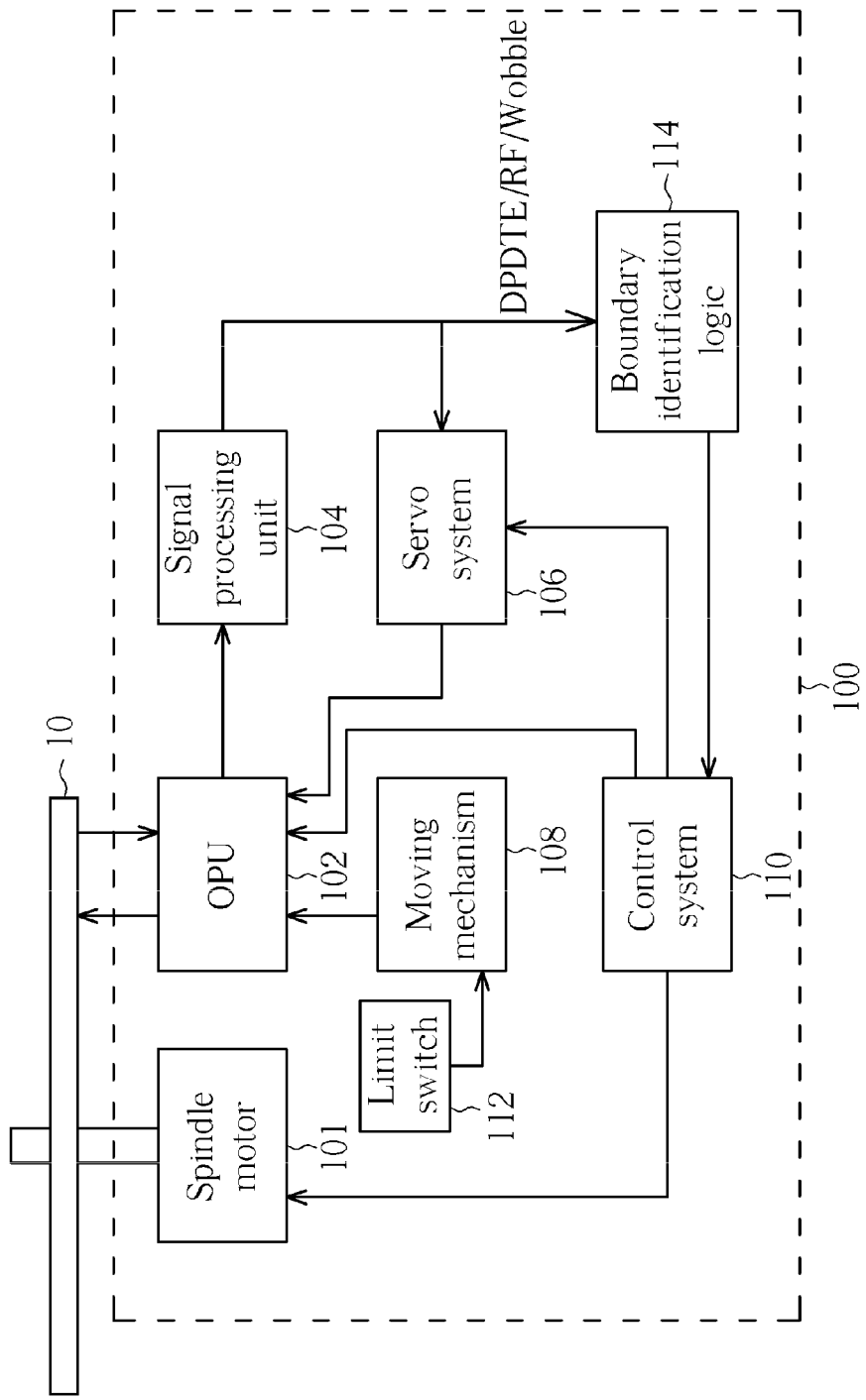
FIG. 1 is a diagram illustrating an exemplary embodiment of an information reproducing apparatus according to the present invention.

FIG. 1 is a diagram illustrating an exemplary embodiment of an information reproducing apparatus 100 according to the present invention. In this exemplary embodiment, the information reproducing apparatus 100 comprises a spindle motor 101, an optical pick-up unit (OPU) 102, a signal processing unit 104, a servo system 106, a moving mechanism 108, a control system 110, a limit switch 112, and a boundary identification logic 114. The spindle motor 101 is implemented for rotating an optical disc 10 (e.g., an HD-DVD disc) at a desired rotational speed when active. The OPU 102 contains a laser diode (not shown) for emitting a laser beam upon the optical disc 102 and a photodiode (not shown) for sensing a reflected laser beam. The signal processing unit 104 is implemented for processing outputs of the OPU 104 to generate synthesized signals to the servo system 106. For example, the signal processing unit 104 outputs a tracking error signal and a focus error signal to the servo system 106. As shown in FIG. 1, the signal processing unit 104 is further coupled to a boundary identification logic 114, and provides the boundary identification logic 114 with desired signals, such as a differential phase detection tracking error (DPDTE) signal, a radio frequency (RF) signal, and a wobble signal.

The servo system 106 then controls the actuators (not shown) in the OPU 102 to move the laser spot in a vertical direction in response to the measured focus error or in a horizontal direction in response to the measured tracking error. The moving mechanism 108 includes circuit components needed for moving the OPU 102. For example, the OPU 102 is placed on a sled, and the moving mechanism 108 includes a stepping motor and related circuit components for moving the OPU 102 to a specific position in a radial direction of the optical disc 10. The control system 110 is configured to control overall operation of the information reproducing apparatus 100, such as enabling/disabling the tracking servo control and focus servo control of the servo system 106 and enabling/disabling the spindle motor 101. As shown in FIG. 1, the information reproducing apparatus 100 has a limit switch 112 to stop the moving of the OPU 102 at a predetermined position at which the limit switch 112 is disposed. Furthermore, the information reproducing apparatus 100 is equipped with the boundary identification logic 114 implemented for identifying a boundary of a predetermined area on the optical disc 10. For simplicity, in the following description, the optical disc 10 is an HD-DVD disc, and the predetermined area on the optical disc 10 is a system lead-in area defined by the HD-DVD specification. However, it should be noted that this is not meant to be limitations of the present invention. Additionally, the components are shown as individual blocks for illustrative purposes only. That is, the components illustrated in FIG. 1 are not limited to be disposed in the information reproducing apparatus 100 separately. Other hardware configurations obeying the spirit of the present invention are possible.

Figure 2:
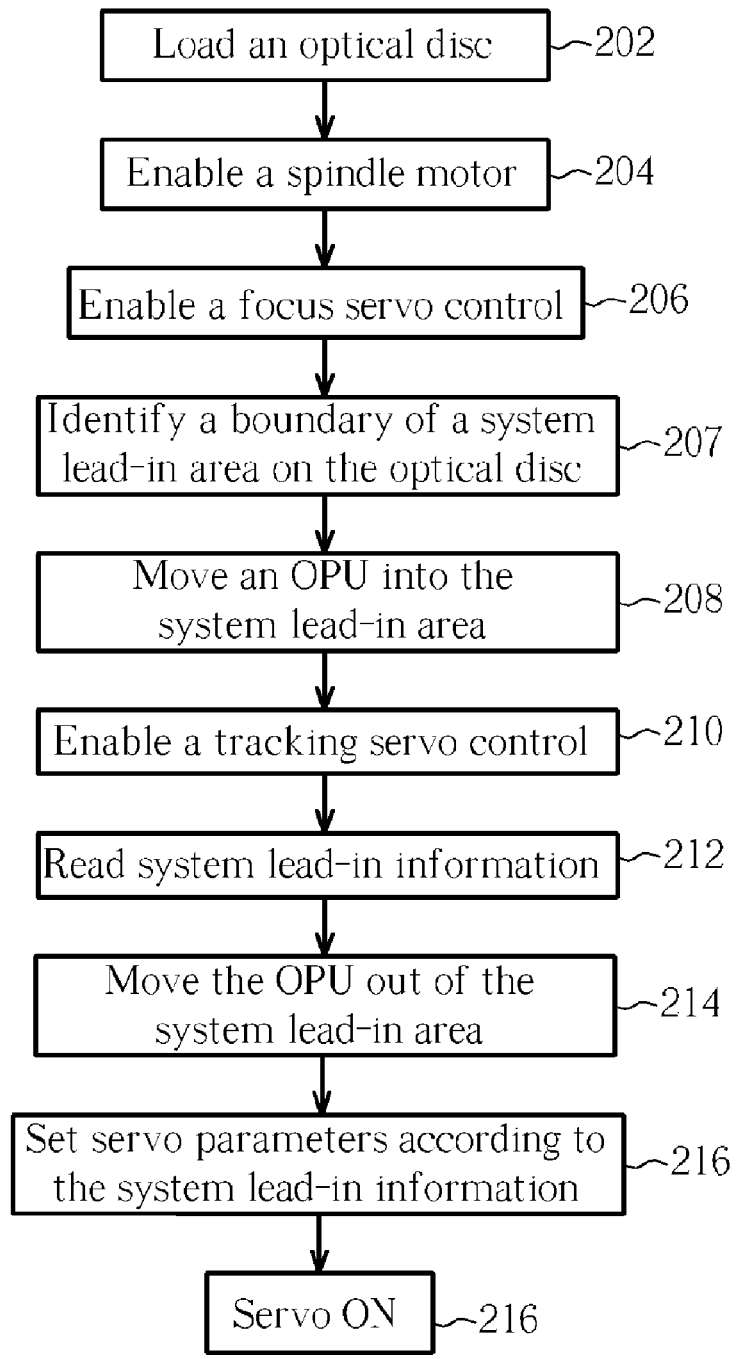
FIG. 2 is a flow chart illustrating operation of the information reproducing apparatus shown in FIG. 1 according to a first embodiment of the present invention.

Please refer to FIG. 1 in conjunction with FIG. 2. FIG. 2 is a flow chart illustrating operation of the information reproducing apparatus 100 shown in FIG. 1 according to a first embodiment of the present invention. Please note that if the result is substantially the same, the steps are not limited to be executed according to the exact order shown in FIG. 2. The flow includes following steps:

Step 202: Load the optical disc 10 into the information reproducing apparatus 100.

Step 204: The control system 110 enables the spindle motor 101 to start rotating the optical disc 10.

Step 206: The control system 110 controls the servo system 106 to enable a focus servo control for locking a focus point of the laser beam outputted from the OPU 102 onto a recording layer of the optical disc 10 (e.g., an HD-DVD disc).

Step 207: The boundary identification logic 114 identifies the boundary of a system lead-in area of the optical disc 10.

Step 208: The control system 110 controls the moving mechanism 108 to move the OPU 102 into the system lead-in area of the optical disc 10.

Step 210: The control system 110 control the servo system 106 to enable a tracking servo control for locking a laser spot of the laser beam outputted from the OPU 102 along a track on the recording layer of the optical 10.

Step 212: The OPU 102 reads the system lead-in information, such as the book type (disc type), mark polarity (high-to-low disc or low-to-high disc), BCA flag, track shape, disc code (disc manufacturer ID), etc.

Step 214: The control system 110 controls the moving mechanism 108 to move the OPU 102 out of the system lead-in area in the optical disc 10.

Step 216: The control system 110 sets servo parameters according to the system lead-in information read from the system lead-in area on the optical disc 10.

Step 218: The control system 110 controls the servo system 106 to properly configure the focus servo control and the tracking servo control according to the servo parameters set in step 216, and then enable the focus servo control, the tracking servo control, or both depending upon operations of the information reproducing apparatus 100. For example, when the OPU 102 is reading data stored on a track of the optical disc 10, the focus servo control and the tracking servo control are both enabled.

As one can see, before the OPU 102 is moved into the system lead-in area, the tracking servo control remains off. In other words, the control system 110 controls the servo system 106 to enable a focus servo control without enabling a tracking servo control in the beginning, and then commands the moving mechanism 108 to move the OPU 102 into the system lead-in area. To clearly illustrate operation of moving the OPU 102 into the system lead-in area pre-formed on the optical disc 10, two exemplary embodiments are given as below. It should be noted that these are for illustrative purposes only, and not meant to be limitations of the present invention.

Figure 3:
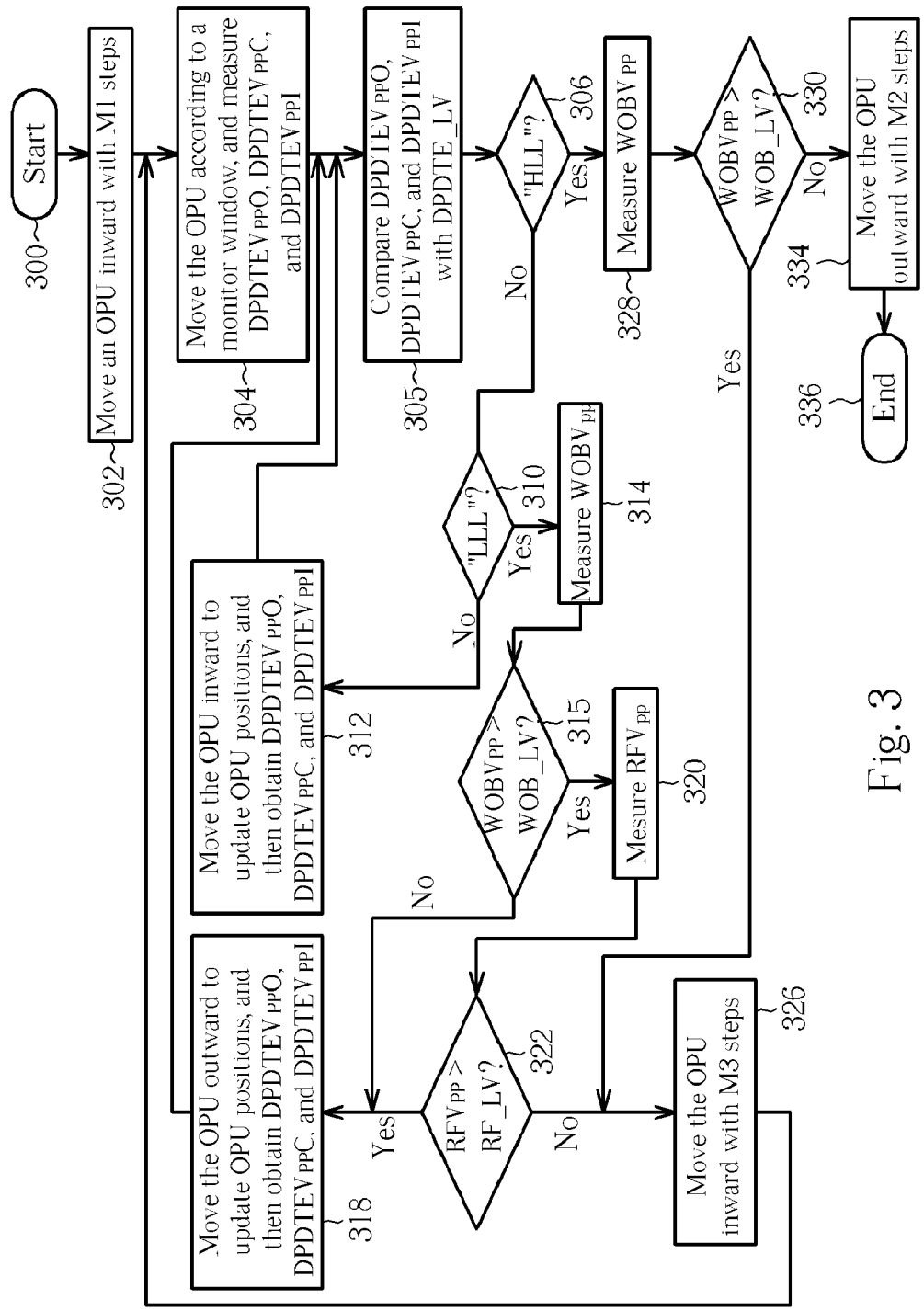
FIG. 3 is a flow chart illustrating a first exemplary embodiment of the steps 207 and 208 shown in FIG. 2.

Please refer to FIG. 3. FIG. 3 is a flow chart illustrating a first exemplary embodiment of the steps 207 and 208 shown in FIG. 2. Please note that if the result is substantially the same, the steps are not limited to be executed according to the exact order shown in FIG. 3. The flow includes following steps:

Step 300: Start.

Step 302: The control system 110 controls the moving mechanism 108 to move the OPU 102 inward with M1 steps.

Step 304: The control system 110 controls the moving mechanism 108 to move the OPU 102 according to a monitor window, and then the boundary identification logic 114 is operative to measure peak-to-peak voltages $DPDTEV_{PP}O$, $DPDTEV_{PP}C$, $DPDTEV_{PP}I$ of a differential phase detection tracking error (DPDTE) signal when the OPU 102 is at three different OPU positions defined in the current monitor window.

Step 305: The boundary identification logic 114 compares the peak-to-peak voltages $DPDTEV_{PP}O$, $DPDTEV_{PP}C$, $DPDTEV_{PP}I$ of the DPDTE signal with a first predetermined threshold value DPDTE_LV to generate a plurality of first comparison results.

Step 306: Does the first comparison results correspond to "HLL"? If yes, go to step 328; otherwise, go to step 310.

Step 310: Does the first comparison results correspond to "LLL"? If yes, go to step 314; otherwise, go to step 312.

Step 312: The control system 110 controls the moving mechanism 108 to move the OPU 102 inward to thereby update OPU positions within the monitor window (i.e., to update the current monitor window), and then obtain peak-to-peak voltages $DPDTEV_{PP}O$, $DPDTEV_{PP}C$, $DPDTEV_{PP}I$ of the DPDTE signal when the OPU 102 is at three different OPU positions defined in the updated monitor window. Go to step 305.

Step 314: The boundary identification logic 114 measures a peak-to-peak voltage $WOBV_{PP}$ of a wobble signal.

Step 315: The boundary identification logic 114 compares the peak-to-peak voltage $WOBV_{PP}$ of the wobble signal with a second predetermined threshold value WOB_LV to generate a second comparison result, and then checks if the second comparison result indicates that the peak-to-peak voltage $WOBV_{PP}$ of the wobble signal is greater than the second predetermined threshold value WOB_LV. If yes, go to step 320; otherwise, go to step 318.

Step 318: The control system 110 controls the moving mechanism 108 to move the OPU 102 outward to thereby update OPU positions within the monitor window (i.e., to update the current monitor window), and then the boundary identification logic 114 obtains peak-to-peak voltages $DPDTEV_{PP}O$, $DPDTEV_{PP}C$, $DPDTEV_{PP}I$ of the DPDTE signal when the OPU 102 is at three different OPU positions in the updated monitor window. Go to step 305.

Step 320: The boundary identification logic 114 measures a peak-to-peak voltage $RFV_{PP}$ of a radio frequency (RF) signal.

Step 322: The boundary identification logic 114 compares the peak-to-peak voltage $RFV_{PP}$ of the RF signal with a third predetermined threshold value RF_LV to generate a third comparison result, and then check if the third comparison result indicates that the peak-to-peak voltage $RFV_{PP}$ of the RF signal is greater than the third predetermined threshold value RF_LV. If yes, go to step 318; otherwise, go to step 326.

Step 326: The control system 110 controls the moving mechanism 108 to move the OPU 102 inward with M3 steps. Go to step 304.

Step 328: The boundary identification logic 114 measures a peak-to-peak voltage $WOBV_{PP}$ of a wobble signal.

Step 330: The boundary identification logic 114 compares the peak-to-peak voltage $WOBV_{PP}$ of the wobble signal with a second predetermined threshold value WOB_LV to generate a second comparison result, and then checks if the second comparison result indicates that the peak-to-peak voltage $WOBV_{PP}$ of the wobble signal is greater than the second predetermined threshold value WOB_LV. If yes, go to step 326; otherwise, go to step 334.

Step 334: The control system 110 controls the moving mechanism 108 to move the OPU 102 outward with M2 steps.

Step 336: End.

In above exemplary flow, three reference signals, including the DPDTE signal, the wobble signal, and the RF signal, are adopted for locating the boundary of the system lead-in area on the loaded optical disc 10. According to the HD-DVD specification, the HD-DVD disc generally contains a data area, a system lead-in area inside the data area, and an un-defined area inside the system lead-in area. Optionally, a burst cutting area (BCA) can be formed on the HD-DVD disc, and is disposed inside the un-defined area. The boundary identification for the system lead-in area is mainly based upon the signal characteristics of the DPDTE signal, the wobble signal, and the RF signal in the un-defined area, system lead-in area, data area, and burst cutting area. Please refer to FIG. 4, which illustrates waveforms of DPDTE signals $S_1$, $S_2$, $S_3$ generated from accessing an HD-DVD read-only disc, a blank HD-DVD recordable disc, a non-blank HD-DVD recordable disc, respectively. As one can see, the DPDTE signal $S_1$ has significant amplitude when generated from accessing the data area or system lead-in area of the HD-DVD read-only disc; however, the DPDTE signal $S_1$ has negligible amplitude when generated from accessing the un-defined area of the HD-DVD read-only disc. Regarding the DPDTE signal $S_2$, it has significant amplitude only when generated from accessing the system lead-in area of the blank HD-DVD recordable disc, and has negligible amplitude when generated from accessing the data area or the un-defined area of the blank HD-DVD recordable disc. If the HD-DVD recordable disc is not blank, meaning that the data area has some data already recorded therein, the DPDTE signal $S_3$ has significant magnitude when generated from accessing recorded data in the data area. For example, the data area includes test zones for writing test data recorded by certain calibration procedures such as the optimum power control. Therefore, when the OPU 102 is moved to the test zones, the DPDTE signal $S_3$ generated from the signal processing unit 104 has significant magnitude accordingly.

Figure 4:
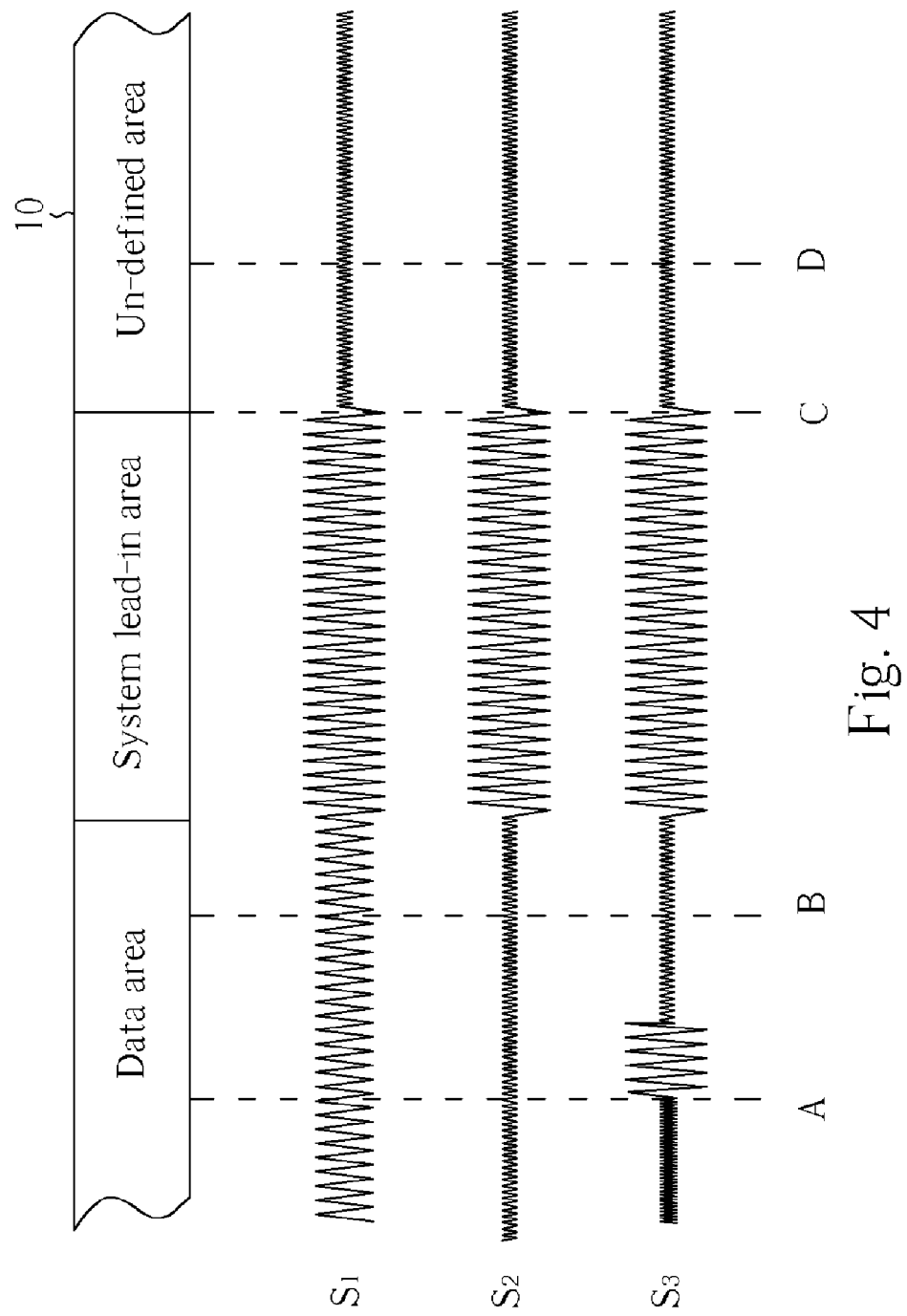
FIG. 4 is a diagram illustrating waveforms of DPDTE signals $S_1$, $S_2$, $S_3$ generated from accessing an HD-DVD read-only disc, a blank HD-DVD recordable disc, a non-blank HD-DVD recordable disc, respectively.

As shown in FIG. 4, at the boundary of the system lead-in area, a transition between significant magnitude and negligible magnitude occurs. In this embodiment, the disclosed method of identifying the boundary of the system lead-in area is to search for a transition from significant magnitude to negligible magnitude when moving the OPU 102 in a radial direction from an outer track to an inner track. However, if the OPU 102 is moved to either of the positions A and C when accessing the non-blank HD-DVD recordable disc, a transition between significant magnitude and negligible magnitude will occur. Therefore, when such a transition is recognized by the boundary identification logic 114, the actual position of the OPU 102 cannot be accurately determined. Similarly, if the OPU 102 is moved to either of the positions B and D when accessing the non-blank HD-DVD recordable disc, the DPDTE signal $S_3$ has negligible magnitude. Therefore, when such a magnitude status is recognized by the boundary identification logic 114, the actual position of the OPU 102 cannot be accurately determined as well. Therefore, the boundary identification logic 114 further refers to the wobble signal for distinguishing the actual position of the OPU 102 because the wobble signal has negligible magnitude when generated from accessing the un-defined area of the HD-DVD read-only disc or HD-DVD recordable disc. As mentioned above, the HD-DVD disc allows an optional burst cutting area formed near the disc center. If the OPU 102 is moved to the burst cutting area, the wobble signal generated from the signal processing unit 104 will have significant magnitude, while the DPDTE signal has negligible magnitude. Therefore, the boundary identification logic 114 is unable to determine whether the OPU 102 is moved to the data area or the burst cutting area by referring to the wobble signal only, if the burst cutting area is formed on the HD-DVD disc. To solve this problem, the boundary identification logic 114 further refers to the RF signal for distinguishing the actual position of the OPU 102 because the RF signal has significant magnitude when generated from accessing the burst cutting area on the HD-DVD disc.

Figure 5:
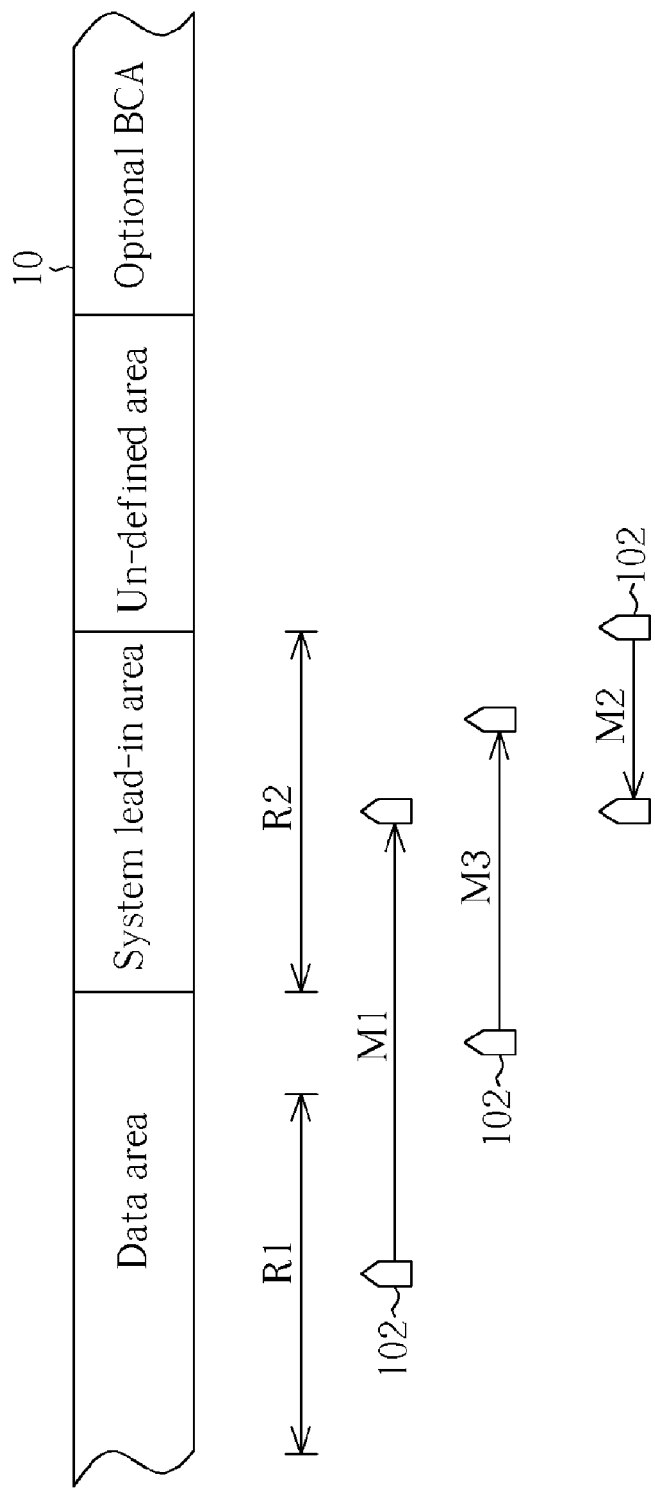
FIG. 5 is a diagram illustrating parameters M1, M2, and M3 that define predetermine displacements of an optical pick-up unit.

Additionally, in the exemplary flow shown in FIG. 3, three parameters M1, M2, and M3 are set to define predetermined displacements of the OPU 102 respectively. As shown in FIG. 5, M1 is a parameter should be well-defined such that the OPU 102 can be moved into the system lean-in area in most cases. For example, if the initial position of the OPU 102 falls in a range R1 when the boundary identification (search) procedure is started, the next position of the OPU 102 will fall in a range R2. M2 is a fixed value and can be calculated according to the track pitch and the adopted control mechanism (e.g., the stepping motor control). Therefore, when the boundary of the system lead-in area is successfully identified, the OPU 102 can be correctly moved into the system lead-in area through the parameter M2. M3 is a parameter should be well-defined such that the OPU 102 can be moved into the system lead-in area in most cases after the failure of moving the OPU 102 into the system lead-in area according to the parameter M1 in the beginning of the boundary identification procedure. Please note these parameters, M1, M2, M3, are for illustrative purposes only, and not meant to be limitations of the present invention. For example, in other embodiments of the present invention, more parameters defining distinct displacements of the OPU 120 are feasible.

Figure 6:
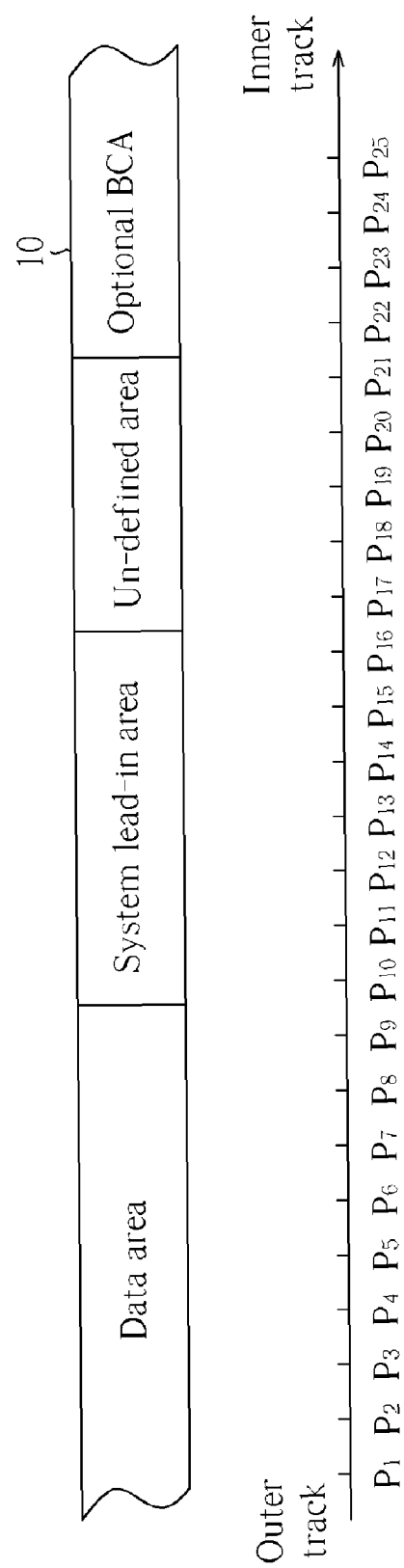
FIG. 6 is a diagram illustrating a plurality of candidate positions $P_1$-$P_{25}$ of an optical pick-up unit.

Please refer to FIG. 3 in conjunction with FIG. 6. FIG. 6 is a diagram illustrating a plurality of candidate positions $P_1$-$P_{25}$ of the OPU 102. Please note that the spacing between adjacent positions is for illustrative purposes only, and is not meant to be a limitation of the present invention. For example, the intervals between adjacent candidate positions $P_1$-$P_{25}$ are equidistant, and each interval corresponding to N steps of the stepping motor (i.e., the moving mechanism 108). To clearly describe the disclosed method of identifying the boundary of the system lead-in area, some examples are given as below.

Case (1)

Suppose that the OPU 102 is not properly moved to the range R1 shown in FIG. 5 when the flow of identifying the boundary of the system lead-in area starts, and the OPU 102 moved in a radial direction of the optical disc 10 from the outer track to the inner track by M1 steps is in the data area, for example, at the position $P_3$ shown in FIG. 6.

In step 304, a peak-to-peak voltage $DPDTEV_{PP}C$ of the DPDTE signal is measured when the OPU 102 is at the position $P_3$. In the present invention, a monitor window defines positions to which the OPU 102 should be moved for obtaining required indication values (e.g., peak-to-peak voltages) from the output of the signal generating unit 104 (e.g., the DPDTE signal, the wobble signal, or the RF signal). For example, three indication values are respectively measured for determining if the boundary of the system lead-in area is found by the current monitor window. Therefore, the OPU 102 is moved inward with N steps to reach the position $P_4$, and then a peak-to-peak voltage $DPDTEV_{PP}I$ of the DPDTE signal is measured. Next, the OPU 102 is moved outward with 2*N steps to reach the position $P_2$, and then a peak-to-peak voltage $DPDTEV_{PP}O$ of the DPDTE signal is measured accordingly. After the peak-to-peak voltages $DPDTEV_{PP}I$, $DPDTEV_{PP}C$, and $DPDTEV_{PP}O$ have been obtained, the OPU 102 is further moved inward with N steps, i.e., the OPU 102 is moved from the position $P_2$ to the original position $P_3$.

It should be noted that the movement of the OPU 102 is not limited to the above scheme. For example, in another embodiment, the OPU 102 is firstly moved outward with N steps to reach the position $P_2$, and then a peak-to-peak voltage $DPDTEV_{PP}O$ of the DPDTE signal is measured. Next, the OPU 102 is moved inward with 2*N steps to reach the position $P_4$, and then a peak-to-peak voltage $DPDTEV_{PP}I$ of the DPDTE signal is measured. After the peak-to-peak voltages $DPDTEV_{PP}I$, $DPDTEV_{PP}C$, and $DPDTEV_{PP}O$ have been obtained, the OPU 102 is moved outward with N steps, i.e., the OPU 102 is moved from the position $P_4$ to the original position $P_3$. This also obeys the spirit of the present invention, and falls in the scope of the present invention.

Additionally, the destination position to which the OPU 102 is moved by M1 steps is not limited to be a center position of the monitor window. In a condition where the position $P_3$ is an outer position of the monitor window, a peak-to-peak voltage $DPDTEV_{PP}O$ of the DPDTE signal is measured when the OPU 102 is moved to the position $P_3$ after step 302, and then the peak-to-peak voltages $DPDTEV_{PP}C$ and $DPDTEV_{PP}I$ are sequentially measured when the OPU 102 is further moved inward to the positions $P_4$ and $P_5$. Similarly, in another condition where the position $P_3$ is an inner position of the monitor window, a peak-to-peak voltage $DPDTEV_{PP}I$ of the DPDTE signal is measured when the OPU 102 is moved to the position $P_3$ after step 302, and then the peak-to-peak voltages $DPDTEV_{PP}C$ and $DPDTEV_{PP}O$ are sequentially measured when the OPU 102 is further moved outward to the positions $P_2$ and $P_1$. In short, the size of the monitor window (i.e., the number of positions included in the monitor window) and the allocation of the positions defined in the monitor window depend upon the design requirements. These all fall in the scope of the present invention.

In step 305, the peak-to-peak voltages $DPDTEV_{PP}O$, $DPDTEV_{PP}C$, $DPDTEV_{PP}I$ of the DPDTE signal are compared with a first predetermined threshold value DPDTE_LV to generate a plurality of first comparison results. If the measured peak-to-peak voltage is greater than the first predetermined threshold value DPDTE_LV, the first comparison result "H" is generated; otherwise, the first comparison result "L" is generated. In step 306, the first comparison results corresponding to the outer position, the center position, and the inner position of the current monitor window are examined to check if the first comparison results correspond to a specific pattern "HLL". For simplicity, in the following description, the position $P_3$ is defined to be a center position of the monitor window. Therefore, when the first comparison results correspond to the specific pattern "HLL", it means that the position $P_3$ is close to the position A or C shown in FIG. 4. It should be noted that though the OPU 102 is supposed to be within the system lead-in area ideally when moved by M1 steps, the boundary identification logic 114, however, has no idea about the actual position of the OPU 102 after step 302. Therefore, if the condition is met, the peak-to-peak voltage $WOBV_{PP}$ of the wobble signal is measured when the OPU 102 is at the position $P_3$ (step 328). Then, the peak-to-peak voltage $WOBV_{PP}$ is compared with a second predetermined threshold value WOB_LV to generate a second comparison result. If the second comparison result indicates that the peak-to-peak voltage $WOBV_{PP}$ is greater than the second predetermined threshold value WOB_LV, it is guaranteed that the position $P_3$ is close to the position A shown in FIG. 4; otherwise, the position $P_3$ is sure to be close to the position C shown in FIG. 4 instead. In this example, since the OPU 102 is still in the data area, the peak-to-peak voltage $WOBV_{PP}$ is greater than the second predetermined threshold value WOB_LV when step 330 is executed. Next, step 326 is executed to move the OPU 102 inward with M3 steps to retry moving the OPU 102 into the system lead-in area of the optical disc 10.

Suppose that the OPU 102 is moved from the position $P_3$ in the data area to the position $P_{13}$ in the system lead-in area according to M3 steps. It should be note that it is not guaranteed that the OPU 102 moved from the current position in the data area with M3 steps will be always placed in the system lead-in area since the current position could be any position within the data area. Therefore, the boundary identification flow keeps running until the position C shown in FIG. 4 is successfully identified. In step 304, the monitor window is updated to include positions $P_{12}$, $P_{13}$, and $P_{14}$, and the peak-to-peak voltages $DPDTEV_{PP}O$, $DPDTEV_{PP}C$, $DPDTEV_{PP}I$ corresponding to the positions $P_{12}$, $P_{13}$, and $P_{14}$ are obtained. It is clear that the conditions in steps 306 and 310 are not met because the first indication results correspond to a pattern "HHH" different from "HLL" and "LLL". In step 312, the OPU 102 is further moved inward to update the positions in the monitor window, and then obtain peak-to-peak voltages $DPDTEV_{PP}O$, $DPDTEV_{PP}C$, and $DPDTEV_{PP}I$ when the OPU 102 is at different positions in the updated monitor window.

Some exemplary embodiment related to updating the monitor window are given as below. In one embodiment of the monitor window updating, the positions in the monitor window are updated by moving the OPU 102 inward with N steps. In this way, the OPU 102 is moved from the position $P_{13}$ to the position $P_{14}$. As a result, previously measured peak-to-peak voltages can be used again. That is, the peak-to-peak voltages $DPDTEV_{PP}C$ and $DPDTEV_{PP}I$ corresponding to positions $P_{13}$ and $P_{14}$ in a previous monitor window become peak-to-peak voltages $DPDTEV_{PP}O$ and $DPDTEV_{PP}C$ assigned to the positions $P_{13}$ and $P_{14}$ in the current monitor window. Therefore, to obtain the peak-to-peak voltage $DPDTEV_{PP}I$, the OPU 102 is moved inward with N steps, i.e., moved from the position $P_{14}$ to the position $P_{15}$. After the peak-to-peak voltages $DPDTEV_{PP}I$ is successfully measured, the OPU 102 is moved outward with N steps, i.e., moved from the position $P_{15}$ back to the original position $P_{14}$.

In another embodiment of the monitor window updating, the positions in the monitor window are updated by moving the OPU 102 inward with 2*N steps. In this way, the OPU 102 is moved from the position $P_{13}$ to the position $P_{15}$. As a result, the previously measured peak-to-peak voltage can be used again. That is, the peak-to-peak voltage $DPDTEV_{PP}I$ corresponding to position $P_{14}$ in a previous monitor window become a peak-to-peak voltage $DPDTEV_{PP}O$ assigned to the position $P_{14}$ in the current monitor window. Therefore, the peak-to-peak voltage $DPDTEV_{PP}C$ is measured when the OPU 102 is at the position $P_{15}$. To obtain the required peak-to-peak voltage $DPDTEV_{PP}I$, the OPU 102 is moved inward with N steps, i.e., moved from the position $P_{15}$ to the position $P_{16}$. After the peak-to-peak voltage $DPDTEV_{PP}I$ is successfully measured, the OPU 102 is further moved outward with N steps, i.e., moved from the position $P_{16}$ back to the original position $P_{15}$.

In yet another embodiment of the monitor window updating, the positions in the monitor window are updated by moving the OPU 102 inward with more steps. In this way, no previously measured peak-to-peak voltage can be used again. For example, the OPU 102 is moved from the position $P_{13}$ to the position $P_{16}$. Therefore, the peak-to-peak voltages $DPDTEV_{PP}O$, $DPDTEV_{PP}C$ and $DPDTEV_{PP}I$ corresponding to positions $P_{15}$, $P_{16}$ and $P_{17}$ have to be measured from the DPDTE signal according to the similar operation in step 304. Further description is omitted here for brevity.

After the peak-to-peak voltages $DPDTEV_{PP}O$, $DPDTEV_{PP}C$ and $DPDTEV_{PP}I$ are successfully obtained in step 312, the flow proceeds to step 306. It is clear the conditions in steps 306 and 310 are not met since the first comparison results of the peak-to-peak voltages $DPDTEV_{PP}O$, $DPDTEV_{PP}C$ and $DPDTEV_{PP}I$ correspond to "HHH". Therefore, the step 312 is repeated to move the monitor window inward until the center position of the monitor window reaches the position $P_{17}$. When the OPU 102 is moved to the position $P_{17}$ due to one of the aforementioned monitor window updating procedures, the condition in step 306 will be met after the peak-to-peak voltages $DPDTEV_{PP}O$, $DPDTEV_{PP}C$ and $DPDTEV_{PP}I$ corresponding to positions $P_{16}$, $P_{17}$, and $P_{18}$ are successfully obtained. At this time, the peak-to-peak voltage $WOBV_{PP}$ is measured and compared to the second predetermined threshold WOB_LV to generate a second comparison result. Since the position $P_{17}$ is in the un-defined area, the second comparison result will indicate that the peak-to-peak voltage $WOBV_{PP}$ is not greater than the second predetermined threshold WOB_LV. Therefore, the boundary identification logic 114 determines that the boundary of the system lead-in area is found, and then notifies the control system 110. Next, the control system 110 controls the moving mechanism 108 to move the OPU 102 outward with M2 steps. Briefly summarized, when the boundary of the system lead-in area is found, it is guaranteed that the OPU 102 can be correctly moved into the system lead-in area according to the pre-defined M2 steps because the boundary of the system lead-in area, in general, is a known and fixed position on the optical disc 10.

On the other hand, after step 312 moves the OPU 102 to the position $P_3$, and step 305 identifies that the peak-to-peak voltages $DPDTEV_{PP}O$, $DPDTEV_{PP}C$ and $DPDTEV_{PP}I$ are not greater than the first predetermined threshold value DPDTE_LV. The condition in step 306 is not met, but the condition in step 310 is met. As mentioned above, though the OPU 102 is supposed to be within the system lead-in area ideally after moved by M1 steps, the boundary identification logic 114, however, has no idea about the actual position of the OPU 102 after step 302. The peak-to-peak voltage $WOBV_{PP}$ of the wobble signal is therefore measured when the OPU 102 is at the position $P_3$ (step 314). Then, the peak-to-peak voltage $WOBV_{PP}$ is compared with a second predetermined threshold value WOB_LV to generate a second comparison result. If the second comparison result indicates that the peak-to-peak voltage $WOBV_{PP}$ is not greater than the second predetermined threshold value WOB_LV, it is guaranteed that the position $P_3$ is located in the un-defined area. For example, the position $P_3$ is close to the position D shown in FIG. 4. Otherwise, the position $P_3$ might be in the data area or the burst cutting area formed on the optical disc 10. In this example, since the OPU 102 is still in the data area, the peak-to-peak voltage $WOBV_{PP}$ will be greater than the second predetermined threshold value WOB_LV when step 315 is executed. Therefore, the peak-to-peak voltage $RFV_{PP}$ of the RF signal is measured when the OPU 102 is at the position $P_3$ to check whether the OPU 102 is in the data area or the burst cutting area (step 324). Then, the peak-to-peak voltage $RFV_{PP}$ is compared with a third predetermined threshold value RF_LV to generate a third comparison result. If the third comparison result indicates that the peak-to-peak voltage $RFV_{PP}$ is not greater than the third predetermined threshold value RF_LV, it is guaranteed that the position $P_3$ is in the data area. For example, the position $P_3$ is close to the position B shown in FIG. 4. Otherwise, the position $P_3$ is determined to be in the burst cutting area. In this example, since the OPU 102 is still in the data area, the peak-to-peak voltage $RFV_{PP}$ will not be greater than the third predetermined threshold value RF_LV. As shown in FIG. 3, the OPU 102 will be moved inward with M3 steps after step 322. If the OPU 102 is moved into the system lead-in area, the boundary identification flow still keeps running until the condition in step 306 is met. Since the following operations have been detailed above, further description is omitted here for brevity.

Case (2)

Suppose that the OPU 102 is properly moved to the range R1 shown in FIG. 5 when the flow of identifying the boundary of the system lead-in area starts, and the OPU 102 moved in a radial direction of the optical disc 10 from the outer track to the inner track by M1 steps is in the system lead-in area, for example, at the position $P_{13}$ shown in FIG. 6.

Since the position $P_{13}$ is the center position of the monitor window in this example, the peak-to-peak voltages $DPDTEV_{PP}I$, $DPDTEV_{PP}C$, and $DPDTEV_{PP}O$ measured in step 304 correspond to positions $P_{12}$, $P_{13}$, and $P_{14}$. It is clear that the peak-to-peak voltages $DPDTEV_{PP}I$, $DPDTEV_{PP}C$, and $DPDTEV_{PP}O$ are greater than the first predetermined threshold value DPDTE_LV. Therefore, conditions in steps 306 and 310 are not met, and the OPU 102 is moved inward to update the monitor window. The boundary identification flow keeps running until the condition in step 306 is met. Since the associated operations have been detailed above, further description is omitted here for brevity.

Case (3)

Suppose that the OPU 102 is not properly moved to the range R1 shown in FIG. 5 when the flow of identifying the boundary of the system lead-in area starts, and the OPU 102 moved in a radial direction of the optical disc 10 from the outer track to the inner track by M1 steps is in the un-defined area, for example, at the position $P_{19}$ shown in FIG. 6.

Since the position $P_{19}$ is the center position of the monitor window in this example, the peak-to-peak voltages $DPDTEV_{PP}I$, $DPDTEV_{PP}C$, and $DPDTEV_{PP}O$ measured in step 304 correspond to positions $P_{18}$, $P_{19}$, and $P_{20}$. It is clear that the peak-to-peak voltages $DPDTEV_{PP}I$, $DPDTEV_{PP}C$, and $DPDTEV_{PP}O$ are not greater than the first predetermined threshold value DPDTE_LV. Therefore, the condition in step 306 is not met, but the condition in step 310 will be met. As mentioned above, though the OPU 102 is supposed to be within the system lead-in area ideally after moved by M1 steps, the boundary identification logic 114 still has no idea about the actual position of the OPU 102 after step 302. The peak-to-peak voltage $WOBV_{PP}$ of the wobble signal is therefore measured when the OPU 102 is at the position $P_{19}$ (step 314). Then, the peak-to-peak voltage $WOBV_{PP}$ is compared with a second predetermined threshold value WOB_LV to generate a second comparison result. In this example, since the OPU 102 is in the un-defined area, the peak-to-peak voltage $WOBV_{PP}$ will not be greater than the second predetermined threshold value WOB_LV when step 315 is executed. Therefore, the OPU 102 is moved outward to update the monitor window. Similarly, the OPU 102 can be moved outward according to any monitor window updating scheme mentioned above. As one can see, step 318 will be repeated until the condition in step 306 is met, meaning that the OPU 102 has been moved to a position close to the position C shown in FIG. 4. Since the following operations have been detailed above, further description is omitted here for brevity.

Case (4)

Suppose that the OPU 102 is not properly moved to the range R1 shown in FIG. 5 when the flow of identifying the boundary of the system lead-in area starts, and the OPU 102 moved in a radial direction of the optical disc 10 from the outer track to the inner track by M1 steps is in the burst cutting area, for example, at the position $P_{24}$ shown in FIG. 6.

Since the position $P_{24}$ is the center position of the monitor window in this example, the peak-to-peak voltages $DPDTEV_{PP}I$, $DPDTEV_{PP}C$, and $DPDTEV_{PP}O$ measured in step 304 correspond to positions $P_{23}$, $P_{24}$, and $P_{25}$. It is clear that the peak-to-peak voltages $DPDTEV_{PP}I$, $DPDTEV_{PP}C$, and $DPDTEV_{PP}O$ are not greater than the first predetermined threshold value DPDTE_LV. Therefore, the condition in step 306 is not met, but the condition in step 310 will be met. As mentioned above, though the OPU 102 is supposed to be within the system lead-in area ideally after moved by M1 steps, the boundary identification logic 114, however, has no idea about the actual position of the OPU 102 after step 302. The peak-to-peak voltage $WOBV_{PP}$ of the wobble signal is therefore measured when the OPU 102 is at the position $P_{24}$ (step 314). Then, the peak-to-peak voltage $WOBV_{PP}$ is compared with a second predetermined threshold value WOB_LV to generate a second comparison result. In this example, since the OPU 102 is in the burst cutting area, the peak-to-peak voltage $WOBV_{PP}$ will be greater than the second predetermined threshold value WOB_LV when step 315 is executed. Therefore, the peak-to-peak voltage $RFV_{PP}$ of the RF signal is measured when the OPU 102 is at the position $P_{24}$ to check whether the OPU 102 is in the data area or the burst cutting area (step 324). Then, the peak-to-peak voltage $RFV_{PP}$ is compared with a third predetermined threshold value RF_LV to generate a third comparison result. In this example, since the OPU 102 is still in the burst cutting area, the peak-to-peak voltage $RFV_{PP}$ will be greater than the third predetermined threshold value RF_LV. As shown in FIG. 3, the OPU 102 will be moved outward to update the monitor window. Referring to the flow shown in FIG. 3, step 318 will be repeated to move the OPU 102 from the burst cutting area into the un-defined area. Since the following operations have been detailed above, further description is omitted here for brevity.

Figure 7:
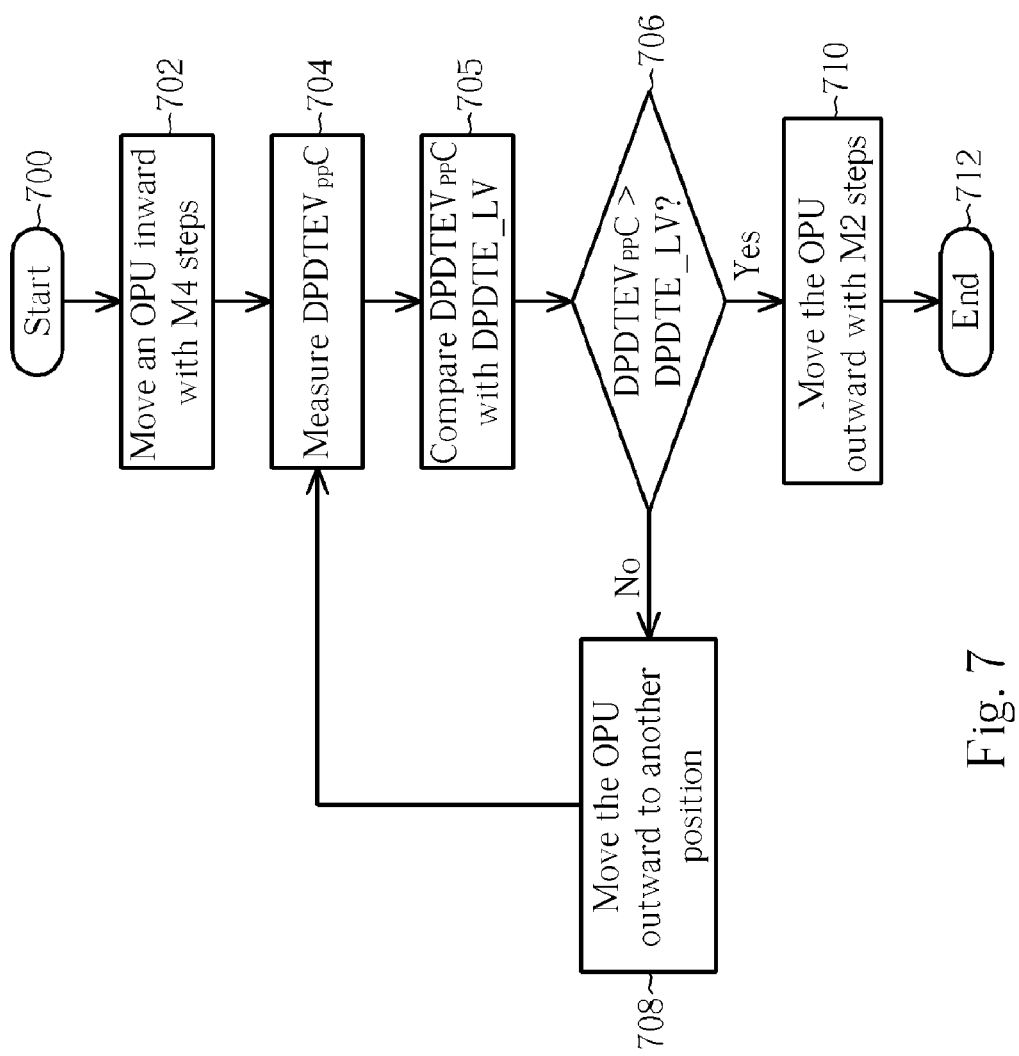
FIG. 7 is a flow chart illustrating a second exemplary embodiment of the steps 207 and 208 shown in FIG. 2.

Please refer to FIG. 7. FIG. 7 is a flow chart illustrating a second exemplary embodiment of the steps 207 and 208 shown in FIG. 2. Please note that if the result is substantially the same, the steps are not limited to be executed according to the exact order shown in FIG. 7. The flow includes following steps:

Step 700: Start.

Step 702: The control system 110 controls the moving mechanism 108 to move the OPU 102 inward with M4 steps.

Step 704: The boundary identification logic 114 measures a peak-to-peak voltage $DPDTEV_{PP}C$ of a differential phase detection tracking error (DPDTE) signal.

Step 705: The boundary identification logic compares the peak-to-peak voltage $DPDTEV_{PP}C$ with a predetermined threshold value DPDTE_LV to generate a comparison result.

Step 706: Does the comparison result indicate that the peak-to-peak voltage $DPDTEV_{PP}C$ is greater than the predetermined threshold value DPDTE_LV? If yes, go to step 710; otherwise, go to step 708.

Step 708: The control system 110 controls the moving mechanism 108 to move the OPU 102 outward to another position, and then go to step 704.

Step 710: The control system 110 controls the moving mechanism 108 to move the OPU 102 outward with M2 steps.

Step 712: End.

Figure 8:
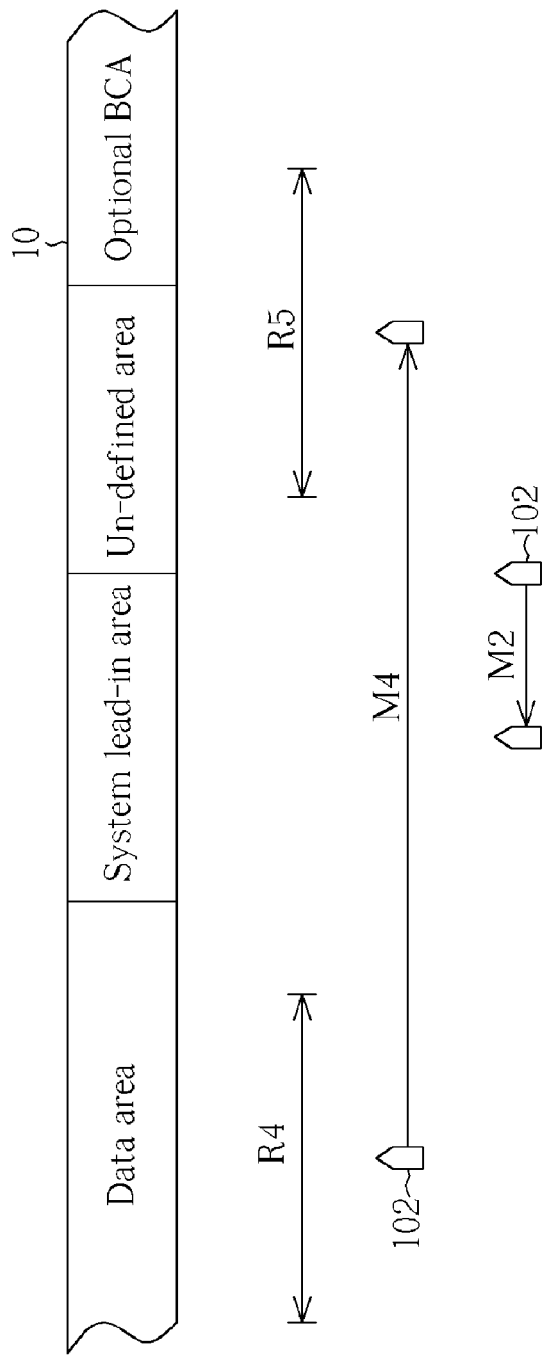
FIG. 8 is a diagram illustrating parameters M2 and M4 that define predetermined displacements of an optical pick-up unit.

In the exemplary flow shown in FIG. 7, two parameters M4 and M2 are set to define predetermined displacements of the OPU 102 respectively. As shown in FIG. 8, M4 is a parameter should be well-defined such that the OPU 102 can be moved into the un-defined area or the burst cutting area. For example, if the initial position of the OPU 102 falls in a range R4 when the boundary search procedure is started, the next position of the OPU 102 will fall in a range R5. M2 is a fixed value and can be calculated according to the track pitch and the adopted control mechanism (e.g., the stepping motor control). Therefore, when the boundary of the system lead-in area is successfully identified, the OPU 102 can be correctly moved into the system lead-in area through the parameter M2.

Please refer to FIG. 7 in conjunction with FIG. 6. An exemplary embodiment is given as below to clearly illustrate the boundary identification flow shown in FIG. 7. Suppose that the OPU 102 is properly moved to the range R4 shown in FIG. 8 when the flow of identifying the boundary of the system lead-in area starts. In step 702, the OPU 102 moved in a radial direction of the optical disc 10 from the inner track to the outer track by M4 steps is in the un-defined area, for example, at the position $P_{18}$ shown in FIG. 6.

In step 704, a peak-to-peak voltage $DPDTEV_{PP}C$ of the DPDTE signal is measured when the OPU 102 is at the position $P_{18}$. Next, the measured peak-to-peak voltage $DPDTEV_{PP}C$ is compared with a predetermined threshold value DPDTE_LV to generate a comparison result. As mentioned before, the DVDTE signal has significant magnitude when the OPU 102 is in the system lead-in area, but has negligible magnitude when the OPU 102 is in the un-defined area or burst cutting area. Therefore, if the comparison result generated in step 705 indicates that the measured peak-to-peak voltage $DPDTEV_{PP}C$ is not greater than the predetermined threshold value DPDTE_LV, it means that the OPU 102 is still in the un-defined area or burst cutting area; however, if the comparison result generated in step 705 indicates that the measured peak-to-peak voltage $DPDTEV_{PP}C$ is greater than the predetermined threshold value DPDTE_LV, it means that the OPU 102 has been moved into the system lead-in area and is close to the boundary of the system lead-in area. In this example, since the current position $P_{18}$ of the OPU 102 is in the un-defined area, the comparison result generated in step 705 indicates that the measured peak-to-peak voltage $DPDTEV_{PP}C$ is not greater than the predetermined threshold value DPDTE_LV. Therefore, step 708 is executed to move the OPU 102 outward with N steps to update its current position to the adjacent position $P_{17}$. Next, the peak-to-peak voltage $DPDTEV_{PP}C$ of the DPDTE signal is measured when the OPU 102 is at the position $P_{17}$, and the measured peak-to-peak voltage $DPDTEV_{PP}C$ is also compared with the predetermined threshold value DPDTE_LV. It is clear that the current position $P_{17}$ of the OPU 102 is still in the un-defined area. Therefore, step 708 is executed again to move the OPU 102 outward with N steps to thereby update the current position by the adjacent position $P_{16}$. Since the current position $P_{16}$ of the OPU 102 is in the system lead-in area and close to the boundary of the system lead-in area, the comparison result generated in step 705 indicates that the measured peak-to-peak voltage $DPDTEV_{PP}C$ is greater than the predetermined threshold value DPDTE_LV. Next, the OPU 102 is moved outward with M2 steps. In this way, the OPU 102 can be moved to the center of the system lead-in area in most cases.

It should be noted that the execution loop of steps 704, 705, 706, and 708 is equivalent to moving the OPU 102 to a plurality of positions in the radial direction of the optical disc 10 respectively; referring to the DPDTE signal for obtaining a plurality of indication values (e.g., peak-to-peak voltages) corresponding to the positions in the radial direction; comparing the indication values with a predetermined threshold value to generate a plurality of comparison results; and then identifying the boundary of the system lead-in area according to the comparison results.

In above exemplary flow shown in FIG. 7, the value of M4 is preset and adjustable. That is, it is programmed before the flow of FIG. 7 is started. However, this is for illustrative purposes only and not meant to be limitations of the present invention. In an alternative design, the amount of displacement of moving the OPU 102 inward is not controlled by any preset or predetermined control value. For example, in the alternative design, step 702 is modified to monitor the peak-to-peak voltage $DPDTEV_{PP}C$ during moving the OPU 102 inward. When the OPU 102 enters the un-defined area from the system lead-in area, the peak-to-peak voltage $DPDTEV_{PP}C$ will have a voltage level drop. Therefore, upon detecting the voltage level drop, the driving force of moving the OPU 102 is stopped. However, the OPU 102 will keep moving for a short distance due to its inertia. As a result, when the OPU 102 stops moving, its instant position is within the un-defined area and close to the boundary between the system lead-in area and the un-defined area. Next, the original steps 704-710 shown in FIG. 7 are performed to move the OPU 102 to the center of the system lead-in area. In short, provided that the OPU can be successfully moved to the un-defined area or optional BCA, the amount of displacement of moving the OPU to the un-defined area/optional BCA could be well-controlled by predetermined programmable settings or dynamically/adaptively controlled by any feasible means. These all obey the spirit of the present invention.

Based upon above disclosure, the generalized method of moving the optical pick-up unit into the system lead-in area includes enabling a focus servo control without enabling a tracking servo control, and then moving an optical pick-up unit in a radial direction of the optical disc; obtaining at least a reference signal according to a laser beam reflected from the optical disc when the optical pick-up unit is moving in the radial direction; and monitoring at least the reference signal to identify a boundary of the system lead-in area on the optical disc.

Furthermore, if the disc type of the loaded optical disc 10 is known in advance, for example, from a user input, not all of the reference signals are required for identifying the boundary of the system lead-in area. For example, if the user inputs the disc type of the loaded HD-DVD read-only disc or blank HD-DVD recordable disc to the information reproducing apparatus 100 by a remote control or any possible means, the boundary identification logic 114 can identify the system lead-in boundary by merely monitoring the signal magnitude variation of the DPDTE signal; similarly, if the user inputs the disc type of the HD-DVD recordable disc to the information reproducing apparatus 100, the boundary identification logic 114 can also identify the system lead-in boundary by merely monitoring the signal magnitude variation of the wobble signal. These alternative designs all fall in the scope of the present invention.

Figure 9:
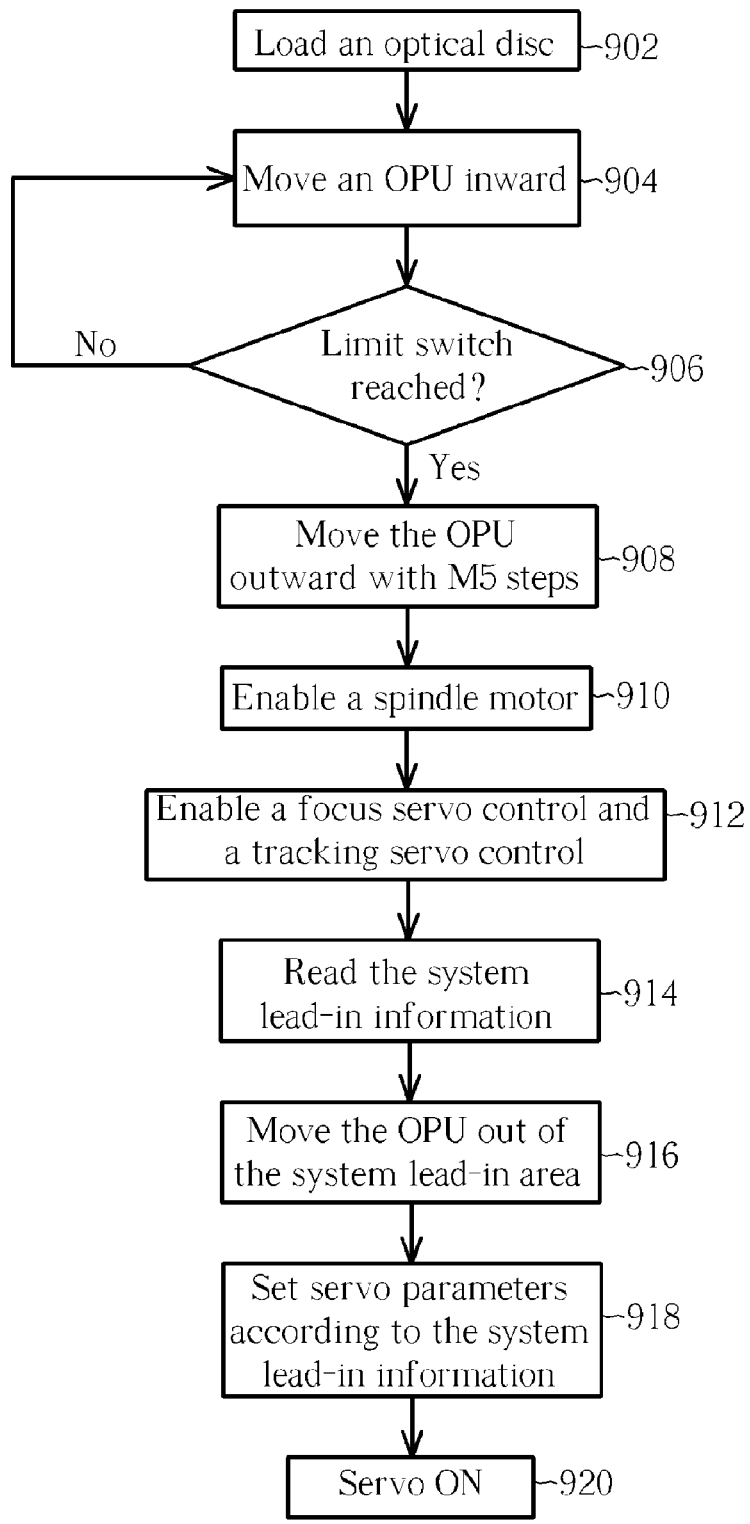
FIG. 9 is a flow chart illustrating operation of the information reproducing apparatus shown in FIG. 1 according to a second embodiment of the present invention.

Please refer to FIG. 1 in conjunction with FIG. 9. FIG. 9 is a flow chart illustrating operation of the information reproducing apparatus 100 according to a second embodiment of the present invention. Please note that if the result is substantially the same, the steps are not limited to be executed according to the exact order shown in FIG. 9. The flow includes following steps:

Step 902: Load the optical disc 10 into the information reproducing apparatus 100.

Step 904: The control system 110 controls the moving mechanism 108 to move the OPU 102 inward.

Step 906: Does the OPU 102 reach the position at which the limit switch 112 is disposed? If yes, go to step 908; otherwise, go to step 904 to keep moving the OPU 102 inward.

Step 908: The control system 110 controls the moving mechanism 108 to move the OPU 102 outward with M5 steps.

Step 910: The control system 110 enables the spindle motor 101 to start rotating the optical disc 10.

Step 912: The control system 110 enables a focus servo control of the servo system 106 to lock a focus point of the laser beam outputted from the OPU 102 to a recording layer of the optical disc 10; and enables a tracking servo control of the servo system 106 to lock a laser spot of the laser beam outputted from the OPU 102 along a track on the recording layer of the optical disc 10.

Step 914: The OPU 102 reads the system lead-in information, such as the book type (disc type), mark polarity (high-to-low disc or low-to-high disc), BCA flag, track shape, disc code (disc manufacturer ID), etc.

Step 916: The control system 110 controls the moving mechanism 108 to move the OPU 102 out of the system lead-in area on the optical disc 10.

Step 918: The control system 110 sets servo parameters according to the system lead-in information read from the system lead-in area on the optical disc 10.

Step 920: The control system 110 controls the servo system 106 to configure the focus servo control and the tracking servo control according to the servo parameters set in step 216 and then enable the focus servo control, the tracking servo control, or both depending upon operations of the information reproducing apparatus 100. For example, when the OPU 102 is reading data stored on a track of the optical disc 10, the focus servo control and the tracking servo control are both enabled.

Figure 10:
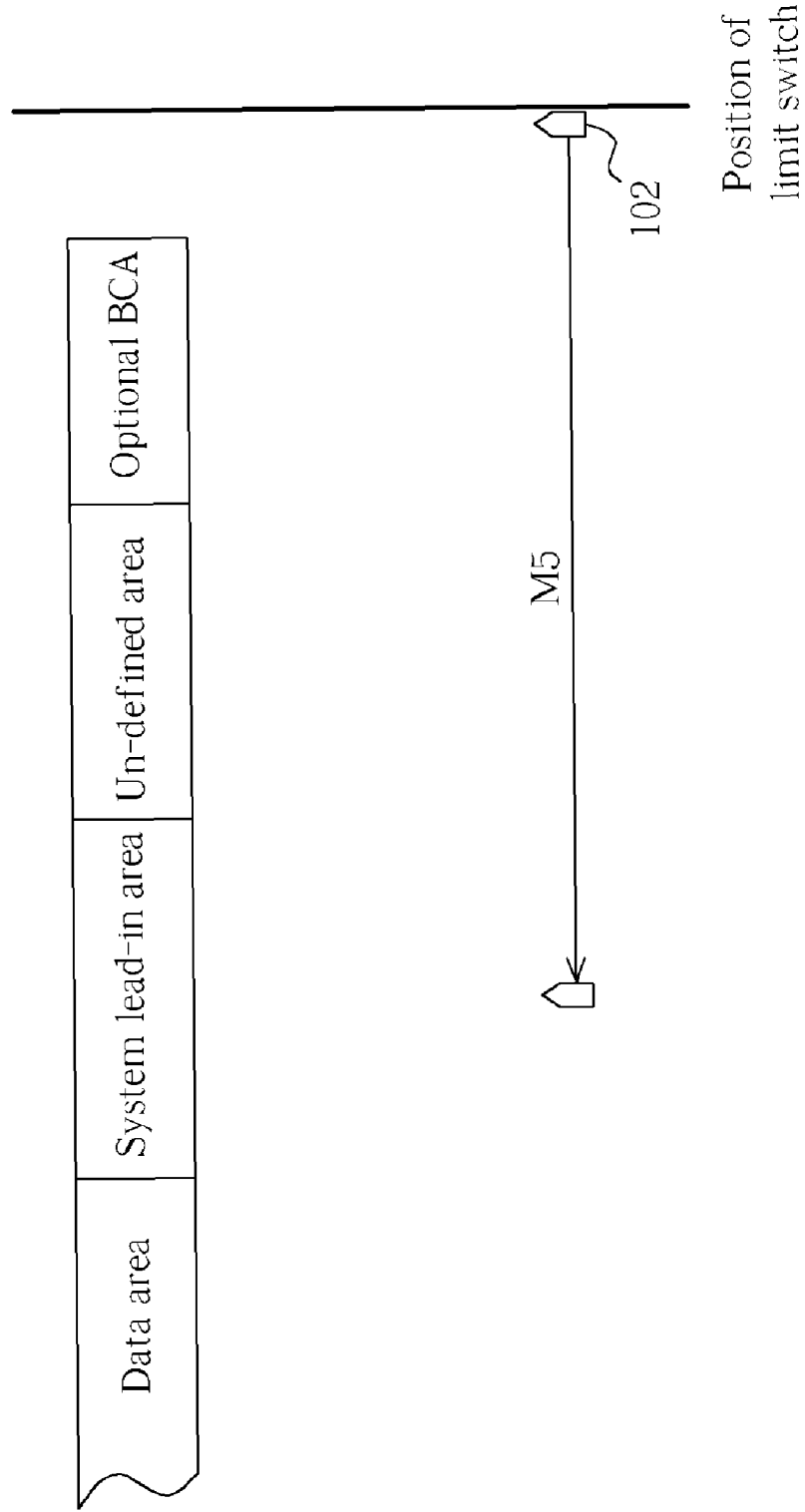
FIG. 10 is a diagram illustrating a parameter M5 that defines a predetermined displacement of an optical pick-up unit.

In the exemplary flow shown in FIG. 9, a parameter M5 is set to define a predetermined displacement of the OPU 102. As shown in FIG. 10, M5 is a parameter should be well-defined such that the OPU 102 can be moved into the system lead-in area from a specific position at which the limit switch 112 is placed. The difference between the embodiments shown in FIG. 9 and FIG. 2 is that the flow of FIG. 9 includes no boundary search operation for the system lead-in area. Instead, the limit switch 112 is implemented to detect if the OPU 102 has reached the specific position where the limit switch 112 is disposed. Since the position of the limit switch 112 is known and fixed when the information reproducing apparatus 100 is fabricated, it is guaranteed that the OPU 102 can be moved into the center of the system lead-in area when the parameter M5 is properly defined. Additionally, please note that the focus servo control and the tracking servo control are allowed to remain off before the OPU 102 has been moved outward with M5 steps because none of the DPDTE signal, wobble signal, and RF signal is required.

Figure 11:
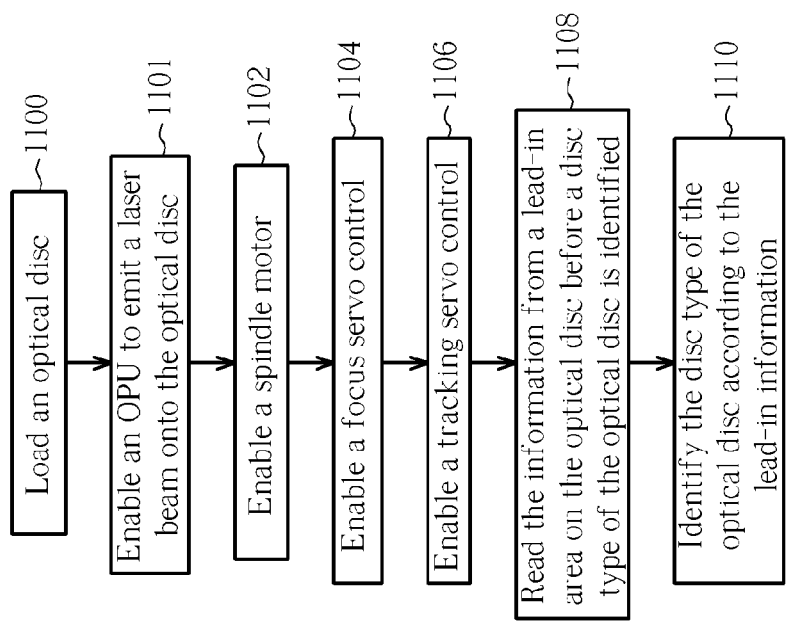
FIG. 11 is a flow chart illustrating operation of the information reproducing apparatus shown in FIG. 1100 according to a third embodiment of the present invention.

Please refer to FIG. 1 in conjunction with FIG. 11. FIG. 11 is a flow chart illustrating operation of the information reproducing apparatus 100 according to a third embodiment of the present invention. Please note that if the result is substantially the same, the steps are not limited to be executed according to the exact order shown in FIG. 11. The flow includes following steps:

Step 1100: Load the optical disc 10.

Step 1101: The control system 110 enables the OPU 102 to emit a laser beam onto the optical disc 10.

Step 1102: The control system 110 enables the spindle motor 101 to start rotating the optical disc 10 at a desired rotational speed.

Step 1104: The control system 110 controls the servo system 106 to enable a focus servo control for locking a focus point of the laser beam onto a recording layer of the optical disc 10.

Step 1106: The control system 110 controls the servo system 106 to enable a tracking servo control for locking a laser spot of the laser beam along a track formed on the recording layer of the optical disc 10.

Step 1108: The OPU 10 reads the information from a lead-in area on the optical disc 10 before a disc type of the optical disc 10 is identified.

Step 1110: The control system 110 identified the disc type of the optical disc 10 according to the lead-in information.

Suppose that the OPU 102 has two laser diodes implemented for emitting a red laser beam having a longer wavelength for accessing a DVD disc and a blue laser beam having a shorter wavelength for accessing an HD-DVD disc, respectively. In step 1100, the control system 110 preferably enables the laser diode capable of emitting a blue laser beam having a shorter wavelength. In the following, the spindle motor 101, the focus servo control, and the tracking servo control are enabled (steps 1102-1106). In this embodiment, the OPU 10 reads the information from the lead-in area (e.g., the system lead-in area on an HD-DVD disc) before the disc type of the optical disc 10 is identified. Please note that one of the above-mentioned schemes of moving the OPU 102 into the system lead-in area or any available means of moving the OPU 102 into the lead-in area before identifying the disc type of the optical disc 10 can be implemented in the flow shown in FIG. 11 to allow the OPU 102 to successfully access the desired lead-in information in step 1108. For example, steps 904, 906, and 908 are added between steps 1100 and 1101. However, this is for illustrative purposes only, and not meant to be taken as a limitation of the present invention. In general, the lead-in area of the optical disc 10 contains the corresponding disc type information. Therefore, the control system 110 can easily identify the disc type of the loaded optical disc 10 by referring to the lead-in information read from the optical disc 10.

Please note that the hardware configuration shown in FIG. 1 supports all of the aforementioned schemes of controlling the optical pick-up unit to move into the lead-in area and then access the lead-in information stored therein. However, this is not meant to be a limitation of the present invention. For example, if the scheme of moving the optical pick-up unit into the lead-in area by using the limit switch is not needed to be supported by the information reproducing apparatus 100 due to design requirements, the limit switch 112 in the information reproducing apparatus 100 can be omitted. In short, any information reproducing apparatus using one of the aforementioned schemes of controlling the optical pick-up unit to move into the lead-in area and then access the lead-in information stored therein falls in the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of accessing an optical disc, comprising:
enabling a focus servo control without enabling a tracking servo control, and then moving an optical pick-up unit in a radial direction of the optical disc;
obtaining at least a first reference signal and a second reference signal according to a laser beam reflected from the optical disc when the optical pick-up unit is moving in the radial direction; and
monitoring at least the first reference signal and the second reference signal to identify a boundary of a predetermined data area on the optical disc, wherein the boundary of the predetermined data area is identified by referring to at least a first result of monitoring the first reference signal and a second result of monitoring the second reference signal.

2. The method of claim 1, wherein the first reference signal is a differential phase detection tracking error (DPDTE) signal and the second reference signal is a wobble signal.

3. The method of claim 1, wherein moving the optical pick-up unit in the radial direction of the optical disc comprises moving the optical pick-up unit to a plurality of specific positions in the radial direction of the optical disc respectively; and monitoring at least the first reference signal and the second reference signal to identify the boundary of the predetermined data area comprises:

referring to the first reference signal for obtaining a plurality of first indication values corresponding to the specific positions in the radial direction of the optical disc respectively;

comparing the first indication values with a first predetermined threshold value to generate a plurality of first comparison results;

referring to the second reference signal for obtaining a second indication value corresponding to one of specific positions;

comparing the second indication value with a second predetermined threshold value to generate a second comparison result; and identifying the boundary of the predetermined data area according to the first comparison results and the second comparison result.

4. The method of claim 3, wherein identifying the boundary of the predetermined data area according to the first comparison results and the second comparison result comprises:

when two successive results of the first comparison results are different from each other, identifying the boundary of the predetermined data area according to the second comparison result.

5. The method of claim 4, wherein the two successive results correspond to a first position and a second position, and the second indication value corresponds to one of the first position and the second position.

6. The method of claim 5, wherein the radial direction of the optical disc includes a first direction from an inner track toward an outer track and a second direction opposite to the first direction; the optical pick-up unit is moved according to a monitor window including the specific positions, where the monitor window is moved according to a current direction selected from the first direction and the second direction to include the specific positions; and moving the optical pick-up unit in the radial direction of the optical disc further comprises:

when the boundary of the predetermined data area is not identified according to the second comparison result, moving the optical pick-up unit to update positions within the monitor window, where the monitor window is moved in the current direction.

7. The method of claim 5, wherein the radial direction of the optical disc includes a first direction from an inner track toward an outer track and a second direction opposite to the first direction; the optical pick-up unit is moved according to a monitor window including the specific positions, where the monitor window is moved according to a current direction selected from the first direction and the second direction to include the specific positions; and moving the optical pick-up unit in the radial direction of the optical disc further comprises:

when the first comparison results do not have two successive results different from each other and all of the first comparison results do not correspond to a specific result, moving the optical pick-up unit to update positions within the monitor window, where the monitor window is moved in the current direction;

when the first comparison results do not have two successive results different from each other and all of the first comparison results do correspond to the specific result, moving the optical pick-up unit to update positions within the monitor window according to the second comparison result.

8. The method of claim 7, wherein moving the optical pick-up unit to update positions within the monitor window according to the second comparison result comprises:

when the second comparison result indicates that the second indication value is greater than the second predetermined threshold value, moving the optical pick-up unit to update positions within the monitor window, where the monitor window is moved in the current direction; and when the second comparison result indicates that the second indication value is not greater than the second predetermined threshold value, updating the current direction by an opposite direction, and then moving the optical pick-up unit to update positions within the monitor window, where the monitor window is moved according to the opposite direction.

9. The method of claim 7, wherein obtaining at least the first reference signal and the second reference signal further comprises obtaining a third reference signal according to the laser beam reflected from the optical disc; and moving the optical pick-up unit to update positions within the monitor window according to the second comparison result comprises:

when the second comparison result indicates that the second indication value is greater than the second predetermined threshold value:

referring to the third reference signal for obtaining a third indication value corresponding to one of the specific positions;

comparing the third indication value with a third predetermined threshold value to generate a third comparison result; and moving the optical pick-up unit to update positions within the monitor window according to the third comparison result; and when the second comparison result indicates that the second indication value is not greater than the second predetermined threshold value, updating the current direction by an opposite direction, and then moving the optical pick-up unit to update positions within the monitor window, where the monitor window is moved according to the opposite direction.

10. The method of claim 9, wherein moving the optical pick-up unit to update positions within the monitor window according to the third comparison result comprises:

when the third comparison result indicates that the third indication value is greater than the third predetermined threshold value, updating the current direction by the opposite direction, and then moving the optical pick-up unit to update positions within the monitor window, where the monitor window is moved according to the opposite direction; and when the third comparison result indicates that the third indication value is not greater than the third predetermined threshold value, moving the optical pick-up unit to update positions within the monitor window, where the monitor window is moved in the current direction.

11. The method of claim 9, wherein the first reference signal is a differential phase detection tracking error (DPDTE) signal, the second reference signal is a wobble signal, and the third reference signal is an RF signal.

12. The method of claim 1, wherein the optical disc complies with an HD-DVD specification, and the predetermined data area is a system lead-in area.

13. A method of accessing an optical disc, comprising:
enabling a focus servo control without enabling a tracking servo control; and
moving the optical pick-up unit in a first direction according to a displacement specified to make the optical pick-up unit placed at a position between a boundary of a predetermined data area and a center of the optical disc, and then moving the optical pick-up unit according to a second direction, wherein a radial direction of the optical disc includes the first direction from an outer track toward an inner track and the second direction opposite to the first direction;
obtaining a reference signal according to a laser beam reflected from the optical disc when the optical pick-up unit is moving in the radial direction; and
monitoring the reference signal to identify the boundary of the predetermined data area on the optical disc.

14. The method of claim 13, wherein monitoring the reference signal to identify the boundary of the predetermined data area comprises: obtaining an indication value corresponding to a specific position, comparing the indication value with a predetermined threshold value to generate a comparison result, and identifying the boundary of the predetermined data area according to the comparison result; and moving the optical pick-up unit according to the second direction comprises moving the optical pick-up unit to a following specific position when the boundary of the predetermined data area is not identified according to the comparison result.

15. The method of claim 13, wherein the optical disc complies with an HD-DVD specification, and the predetermined data area is a system lead-in area.

16. An information reproducing apparatus, comprising:
an optical pick-up unit, for accessing an optical disc;
a moving mechanism, coupled to the optical pick-up unit;
a servo system, coupled to the optical pick-up unit, the servo system having a focus servo control and a tracking servo control;
a control system, coupled to the servo system and the moving mechanism, for controlling the servo system to enable the focus servo control without enabling the tracking servo control and then controlling the moving mechanism to move the optical pick-up unit in a radial direction of the optical disc;
a signal processing unit, coupled to the optical pick-up unit, for obtaining at least a first reference signal and a second reference signal according to a laser beam reflected from the optical disc when the optical pick-up unit is moving in the radial direction; and
a boundary identification logic, coupled to the signal processing unit, for monitoring at least the first reference signal and the second reference signal to identify a boundary of a predetermined data area on the optical disc, wherein the boundary identification logic identifies the boundary of the predetermined data area by referring to at least a first result of monitoring the first reference signal and a second result of monitoring the second reference signal.

17. The information reproducing apparatus of claim 16, wherein the first reference signal is a differential phase detection tracking error (DPDTE) signal and the second reference signal is a wobble signal.

18. The information reproducing apparatus of claim 16, wherein the control system controls the moving mechanism to move the optical pick-up unit to a plurality of specific positions in the radial direction of the optical disc respectively; and the boundary identification logic refers to the first reference signal for obtaining a plurality of first indication values corresponding to the specific positions in the radial direction of the optical disc respectively, compares the first indication values with a first predetermined threshold value to generate a plurality of first comparison results, refers to the second reference signal for obtaining a second indication value corresponding to one of specific positions, compares the second indication value with a second predetermined threshold value to generate a second comparison result, and identifies the boundary of the predetermined data area according to the first comparison results and the second comparison result.

19. The information reproducing apparatus of claim 18, wherein the boundary identification logic identifies the boundary of the predetermined data area according to the second comparison result when two successive results of the first comparison results are different from each other.

20. The information reproducing apparatus of claim 19, wherein the two successive results correspond to a first position and a second position, and the second indication value corresponds to one of the first position and the second position.

21. The information reproducing apparatus of claim 20, wherein the radial direction of the optical disc includes a first direction from an inner track toward an outer track and a second direction opposite to the first direction; the optical pick-up unit is moved according to a monitor window including the specific positions, where the monitor window is moved according to a current direction selected from the first direction and the second direction to include the specific positions; and when the boundary of the predetermined data area is not identified according to the second comparison result, the control system controls the moving mechanism to move the optical pick-up unit to update positions within the monitor window, where the monitor window is moved in the current direction.

22. The information reproducing apparatus of claim 20, wherein the radial direction of the optical disc includes a first direction from an inner track toward an outer track and a second direction opposite to the first direction; the optical pick-up unit is moved according to a monitor window including the specific positions, where the monitor window is moved according to a current direction selected from the first direction and the second direction to include the specific positions; when the first comparison results do not have two successive results different from each other and all of the first comparison results do not correspond to a specific result, the control system controls the moving mechanism to move the optical pick-up unit to update positions within the monitor window, where the monitor window is moved in the current direction; when the first comparison results do not have two successive results different from each other and all of the first comparison results do correspond to the specific result, the control system controls the moving mechanism to move the optical pick-up unit to update positions within the monitor window according to the second comparison result.

23. The information reproducing apparatus of claim 22, wherein when the second comparison result indicates that the second indication value is greater than the second predetermined threshold value, the control system controls the moving mechanism to move the optical pick-up unit to update positions within the monitor window, where the monitor window is moved in the current direction; and when the second comparison result indicates that the second indication value is not greater than the second predetermined threshold value, the control system controls the moving mechanism to update the current direction by an opposite direction, and then controls the moving mechanism to move the optical pick-up unit to update positions within the monitor window, where the monitor window is moved according to the opposite direction.

24. The information reproducing apparatus of claim 22, wherein the signal processing unit further obtains a third reference signal according to the laser beam reflected from the optical disc; when the second comparison result indicates that the second indication value is greater than the second predetermined threshold value, the boundary identification logic refers to the third reference signal for obtaining a third indication value corresponding to one of the specific positions, compares the third indication value with a third predetermined threshold value to generate a third comparison result, and moves the optical pick-up unit to update positions within the monitor window according to the third comparison result; and when the second comparison result indicates that the second indication value is not greater than the second predetermined threshold value, the control system controls the moving mechanism to update the current direction by an opposite direction, and then controls the moving mechanism to move the optical pick-up unit to update positions within the monitor window, where the monitor window is moved according to the opposite direction.

25. The information reproducing apparatus of claim 24, wherein when the third comparison result indicates that the third indication value is greater than the third predetermined threshold value, the control system controls the moving mechanism to update the current direction by the opposite direction, and then controls the moving mechanism to move the optical pick-up unit to update positions within the monitor window, where the monitor window is moved according to the opposite direction; and when the third comparison result indicates that the third indication value is not greater than the third predetermined threshold value, the control system controls the moving mechanism to move the optical pick-up unit to update positions within the monitor window, where the monitor window is moved in the current direction.

26. The information reproducing apparatus of claim 24, wherein the first reference signal is a differential phase detection tracking error (DPDTE) signal, the second reference signal is a wobble signal, and the third reference signal is an RF signal.

27. The information reproducing apparatus of claim 16, wherein the optical disc complies with an HD-DVD specification, and the predetermined data area is a system lead-in area.

28. An information reproducing apparatus, comprising:
an optical pick-up unit, for accessing an optical disc;
a moving mechanism, coupled to the optical pick-up unit;
a servo system, coupled to the optical pick-up unit, the servo system having a focus servo control and a tracking servo control;
a control system, coupled to the servo system and the moving mechanism, for controlling the servo system to enable the focus servo control without enabling the tracking servo control and then controlling the moving mechanism to move the optical pick-up unit in a first direction according to a displacement specified to make the optical pick-up unit placed at a position between a boundary of a predetermined data area and a center of the optical disc and then move the optical pick-up unit according to a second direction, wherein a radial direction of the optical disc includes the first direction from an outer track toward an inner track and the second direction opposite to the first direction;
a signal processing unit, coupled to the optical pick-up unit, for obtaining a reference signal according to a laser beam reflected from the optical disc when the optical pick-up unit is moving in the radial direction; and
a boundary identification logic, coupled to the signal processing unit, for monitoring the reference signal to identify the boundary of the predetermined data area on the optical disc.

29. The information reproducing apparatus of claim 28, wherein the boundary identification logic obtains an indication value corresponding to a specific position, compares the indication value with a predetermined threshold value to generate a comparison result, and identifies the boundary of the predetermined data area according to the comparison result; and the control system controls the moving mechanism to move the optical pick-up unit to a following specific position when the boundary of the predetermined data area is not identified according to the comparison result.

30. The information reproducing apparatus of claim 28, wherein the optical disc complies with an HD-DVD specification, and the predetermined data area is a system lead-in area.

* * * * *